United States Patent
Massover et al.

(10) Patent No.: US 11,501,391 B2
(45) Date of Patent: Nov. 15, 2022

(54) METHOD AND OPERATION OF A PORTABLE DEVICE AND A CLOUD SERVER FOR PRESERVING THE CHAIN OF CUSTODY FOR DIGITAL EVIDENCE

(71) Applicant: MOTOROLA SOLUTIONS, INC, Chicago, IL (US)

(72) Inventors: Alexander Massover, Bathefer (IL); Dafna Langerman, Givatayim (IL); Steven D. Tine, Cheshire, CT (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 739 days.

(21) Appl. No.: 16/226,905

(22) Filed: Dec. 20, 2018

(65) Prior Publication Data
US 2020/0202465 A1 Jun. 25, 2020

(51) Int. Cl.
*G06Q 50/18* (2012.01)
*H04L 9/40* (2022.01)
*H04L 67/1097* (2022.01)

(52) U.S. Cl.
CPC .......... *G06Q 50/18* (2013.01); *H04L 63/083* (2013.01); *H04L 67/1097* (2013.01)

(58) Field of Classification Search
CPC ............................. G06Q 50/18; H04L 63/083
See application file for complete search history.

(56) References Cited

U.S. PATENT DOCUMENTS

2014/0143545 A1 5/2014 McKeeman et al.
2016/0062992 A1 3/2016 Chen et al.
2016/0066085 A1* 3/2016 Chang ............... G06F 21/79
  381/122
2017/0230605 A1 8/2017 Han et al.

FOREIGN PATENT DOCUMENTS

WO 2017011694 A1 1/2017

OTHER PUBLICATIONS

Nieto, IoT—Forensics Meets Privacy: Towards Cooperative Digital Investigations, https://www.ncbi.nlm.nih.gov/pmc/articles/PMC5856102/ (Year: 2018).*
Delport, Isolating a Cloud Instance for a Digital Forensic Investigation (Year: 2011).*
The International Search Report and the Written Opinion corresponding patent application No. PCT/US2019/064849 filed Dec. 6, 2019, dated Feb. 26, 2020, all pages.

* cited by examiner

*Primary Examiner* — Aryan E Weisenfeld
(74) *Attorney, Agent, or Firm* — Raguraman Kumaresan

(57) ABSTRACT

A process for preserving chain of custody for digital evidence captured at a portable device. The portable device transmits a request to upload the digital evidence to the cloud server via an intermediary storage device. The request includes digitally signed evidence metadata with data integrity code and authentication credentials. The portable device receives a response indicating approval to upload the digital evidence to the cloud server via the intermediary storage device. The portable device transmits the digital evidence to the intermediary storage device for uploading to the cloud server, and further transmits a request for approval to delete the digital evidence from the portable device. The portable device deletes the digital evidence only after receiving a response from the cloud server indicating an approval to delete the digital evidence from the portable device.

21 Claims, 5 Drawing Sheets

METHOD AND OPERATION OF A PORTABLE DEVICE AND A CLOUD SERVER FOR PRESERVING THE CHAIN OF CUSTODY FOR DIGITAL EVIDENCE

BACKGROUND OF THE INVENTION

Public safety agencies record and store large amount of digital data for investigation and record purposes. Some of the recorded data is also presented in the court as an evidence. However, since such data is often transferred from one device to another device, it is important to preserve the chain of custody for data in order for the data to be admitted as an evidence.

BRIEF DESCRIPTION OF THE SEVERAL VIEWS OF THE DRAWINGS

The accompanying figures, where like reference numerals refer to identical or functionally similar elements throughout the separate views, which together with the detailed description below, are incorporated in and form part of the specification and serve to further illustrate various embodiments of concepts that include the claimed invention, and to explain various principles and advantages of those embodiments.

Figure 1:
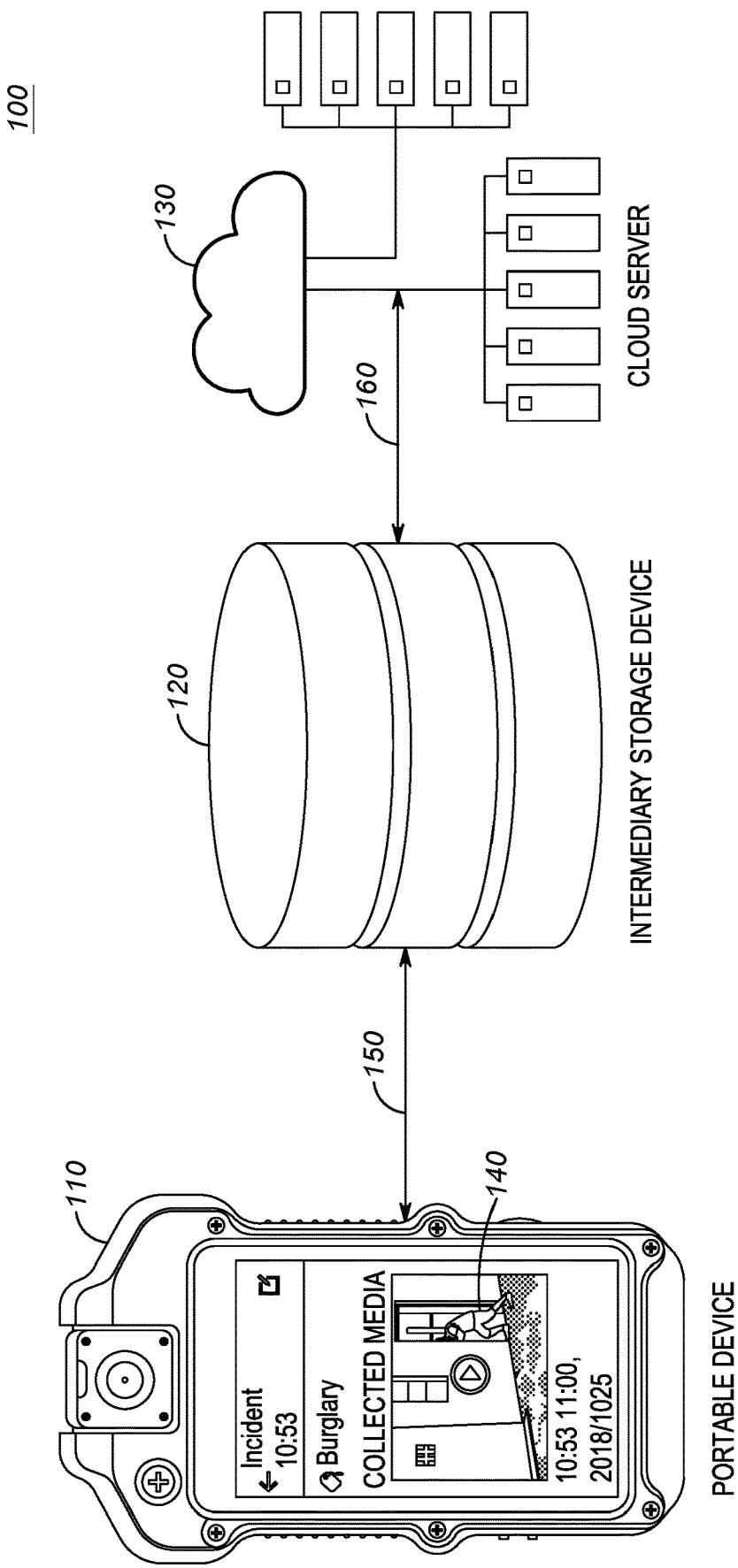
FIG. 1 is a system diagram illustrating a system in accordance with some embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As mentioned above, preserving the chain of custody for recorded data even after the data is transferred from a source device (e.g., a camera) to another device (e.g., a data storage server) is an important requirement for admitting the recorded data into evidence. Preserving the chain of custody means that the data is only transferred to and/or stored at devices authorized and trusted for such purposes. It is also important to ensure that the data is not tampered with or modified by intermediaries during the transfer of the data from one device to another device.

Public safety agencies assign portable devices such as cameras to officers for capturing digital evidence such as image and/or video data. The captured digital evidence is transferred to a central evidentiary repository (e.g., a data storage server) for further processing so that the cameras can be reused for recording another evidence and/or re-assigned to another user (e.g., after the current officer's work shift). However, portable devices may only have limited storage capacity compared to a storage capacity of the data storage server. Also, some portable devices may not have network capability or may have only limited network capability to stream/transfer the captured data to the server. Further, some portable devices may not have enough battery capacity to fully support the transfer of the digital evidence to the server. To address the above issues, intermediary storage devices, that have larger storage capacity, larger battery capacity, or better network capability relative to portable devices, are used to assist the portable devices in successfully transferring the recorded data to the repository. Some intermediary storage devices such as multi-unit chargers are also capable of charging (e.g., via wired or wireless charging means) the portable devices during the transfer of the digital evidence.

In such situations when intermediary storage devices are employed for data transfer, it is also important to ensure that the chain of custody for the digital evidence is not violated. Additionally, it is important that the authenticity of the intermediary storage devices is validated to ensure that the digital evidence is not transferred to an un-trusted malicious entity. Further, portable devices are often shared among the users in organizations such as public safety. Such organizations may prefer that the digital evidence is transferred to the evidentiary repository prior to device being made available for a new user, for example, where there is a need to redeploy the device for re-assignment to a new user at the end of work shift of the previous user. During the re-assignment process, there is a possibility of the chain of custody for digital evidence being violated when the new user attempts to access the digital evidence previously stored at the device or when the device is placed for re-assignment, for example, on a shared shelf where there is a chance for the device to be lost or stolen, or the digital evidence to be modified or tampered with by a malicious person. So, it is also important to ensure that the digital evidence is fully transferred to the evidentiary repository prior to the device re-assignment to prevent violation of chain of custody during re-assignment of the device from one user to another user. This also requires that the digital evidence is not erased from the source portable device before the digital evidence is completely transferred to the server and acknowledged as such. Disclosed is an improved process that addresses the above presented technical issues and requirement in preserving the chain of custody for digital evidence captured at portable devices.

One exemplary embodiment provides a method for preserving chain of custody for digital evidence captured at a portable device. The method comprises transmitting, at the portable device, to a cloud server, a request for approval to upload the digital evidence to the cloud server via an intermediary storage device, the request comprising a digitally signed metadata associated with the digital evidence, a first authentication credential associated with the intermediary storage device, and a second authentication credential associated with the portable device, wherein the digitally signed metadata includes a data integrity code that is generated as a function of the content of the digital evidence to be uploaded; receiving, at the portable device, a first response to the request for approval from the cloud server, the first response indicating approval to upload the digital evidence to the cloud server via the intermediary storage device; responsive to receiving the first response, transmitting, at the portable device, the digital evidence to the intermediary storage device for uploading to the cloud server; transmitting, at the portable device, to the cloud server, a request for approval to delete the digital evidence from the portable device; receiving, at the portable device, a second response from the cloud server, the second response indicating an approval to delete the digital evidence from the portable device; and responsive to receiving the second response, deleting, at the portable device, the digital evidence from the portable device.

Another exemplary embodiment provides a method for preserving chain of custody for digital evidence captured at a portable device. The method comprises: receiving, at a cloud server, from the portable device, a request for approval to upload the digital evidence to the cloud server via an intermediary storage device, the request comprising digitally signed metadata associated with the digital evidence, a first authentication credential associated with the portable device, and a second authentication credential associated with the intermediary storage device, wherein the digitally signed metadata includes a data integrity code that is generated as a function of the digital evidence to be uploaded; verifying, at the cloud server, whether the request is valid based on the information included in the digitally signed metadata, first authentication credential, and second authentication credential; responsive to verifying that the request is valid, transmitting, at the cloud server, to the portable device, a first response indicating approval to upload the digital evidence to the cloud server via the intermediary storage device; receiving, at the cloud server, in response to transmitting the first response, the digital evidence from the portable device via the intermediary storage device; validating, at the cloud server, the data integrity of received digital evidence using the data integrity code; storing the received digital evidence at a cloud storage component associated with the cloud server when the data integrity of the received digital evidence is valid; receiving, at the cloud server, a request for approval to delete the digital evidence from the portable device; and transmitting, at the cloud server, a second response indicating an approval to delete the digital evidence from the portable device.

A further exemplary embodiment provides a portable device, comprising: a memory for storing a captured digital evidence; a communications unit configured to be coupled with an intermediary storage device for transferring the digital evidence to a cloud server via the intermediary storage device; and an electronic processor communicatively coupled with the memory and communications unit, the electronic processor configured to: transmit, via the communications unit, to a cloud server, a request for approval to upload the digital evidence to the cloud server via the intermediary storage device, the request comprising a digitally signed metadata associated with the digital evidence, a first authentication credential associated with the intermediary storage device, and a second authentication credential associated with the portable device, wherein the digitally signed metadata includes a data integrity code that is generated as a function of the digital evidence to be uploaded; receive, via the communications unit, a first response to the request for approval from the cloud server, the first response indicating approval to upload the digital evidence to the cloud server via the intermediary storage device; responsive to receiving the first response, transmit, via the communications unit, the digital evidence to the intermediary storage device for uploading to the cloud server; transmit, via the communications unit, to the cloud server, a request for approval to delete the digital evidence from the memory; receive, via the communications unit, a second response from the cloud server, the second response indicating an approval to delete the digital evidence from the portable device; and responsive to receiving the second response, delete the digital evidence from the memory.

Each of the above-mentioned embodiments will be discussed in more detail below, starting with an example system including a portable device, an intermediary storage device, and a cloud server in which the embodiments may be practiced, followed by an illustration of processing steps for achieving the method of operating the portable device and cloud server. Further advantages and features consistent with this disclosure will be set forth in the following detailed description, with reference to the figures.

Referring now to drawings and in particular to FIG. 1, a communication system diagram illustrates a system 100 including a portable device 110, an intermediary storage device 120, and a cloud server 130. The portable device 110 may be any computing device that is capable of capturing and/or storing digital evidence 140 that may take form of an audio, image, video, text, and the like. In accordance with some embodiments, the portable device 110 may be operated or associated with a public safety agency officer, who may carry or wear the portable device 110. In one embodiment, the portable device 110 is a body wearable camera that is used to capture digital evidence 140 in the form of image and/or video data. An example portable device 110 in the form of a body wearable camera is shown in FIG. 1 with a display presenting a thumbnail of a video evidence that is captured corresponding to a burglary incident. In accordance with some embodiments, the portable device 110 has one or more of limited storage capacity, limited battery capacity, and limited or no network capability in comparison to the intermediary storage device 120 (for example, that has one or more of larger storage capacity, larger battery capacity (or unlimited power supply), or better network capability), and therefore establishes a connection with the intermediary storage device 120 for uploading the captured digital evidence 140 to the cloud server 130.

The intermediary storage device 120 may be any data storage device that is capable of being communicatively coupled to the portable device 110 via a first communication link 150 at one end and further capable of being communicatively coupled to the cloud server 130 via a second communication link 160 at other end to facilitate the transfer of the digital evidence 140 captured at the portable device 110 to the cloud server 130. In one embodiment, the communication link 150 corresponds to a short range wireless connection that is established, for example, in accordance with one or more communication protocols/standards such as Bluetooth, Wi-Fi, Zigbee, Z-Wave, or infrared wireless connection, that enables the intermediary storage device 120 to wirelessly receive the digital evidence 140 from the portable device 110 for further uploading the digital evidence 140 to the cloud server 130. In another embodiment, the first communication link 150 corresponds to a wired connection (e.g., established using a data cable) to the portable device 110 to enable the transfer of the digital evidence 140. In yet another embodiment, the first communication link 150 can be established via physical coupling of the portable device 110 to the intermediary storage device 120, which can be achieved when one or more contacts (e.g., battery/data contacts) of the intermediary storage device 120 are aligned and mated with the corresponding one or more contacts of the portable device 110. This embodiment is further illustrated in FIG. 2, where an intermediary storage device 120 functioning as a multi-unit charger 200 is shown.

Figure 2:
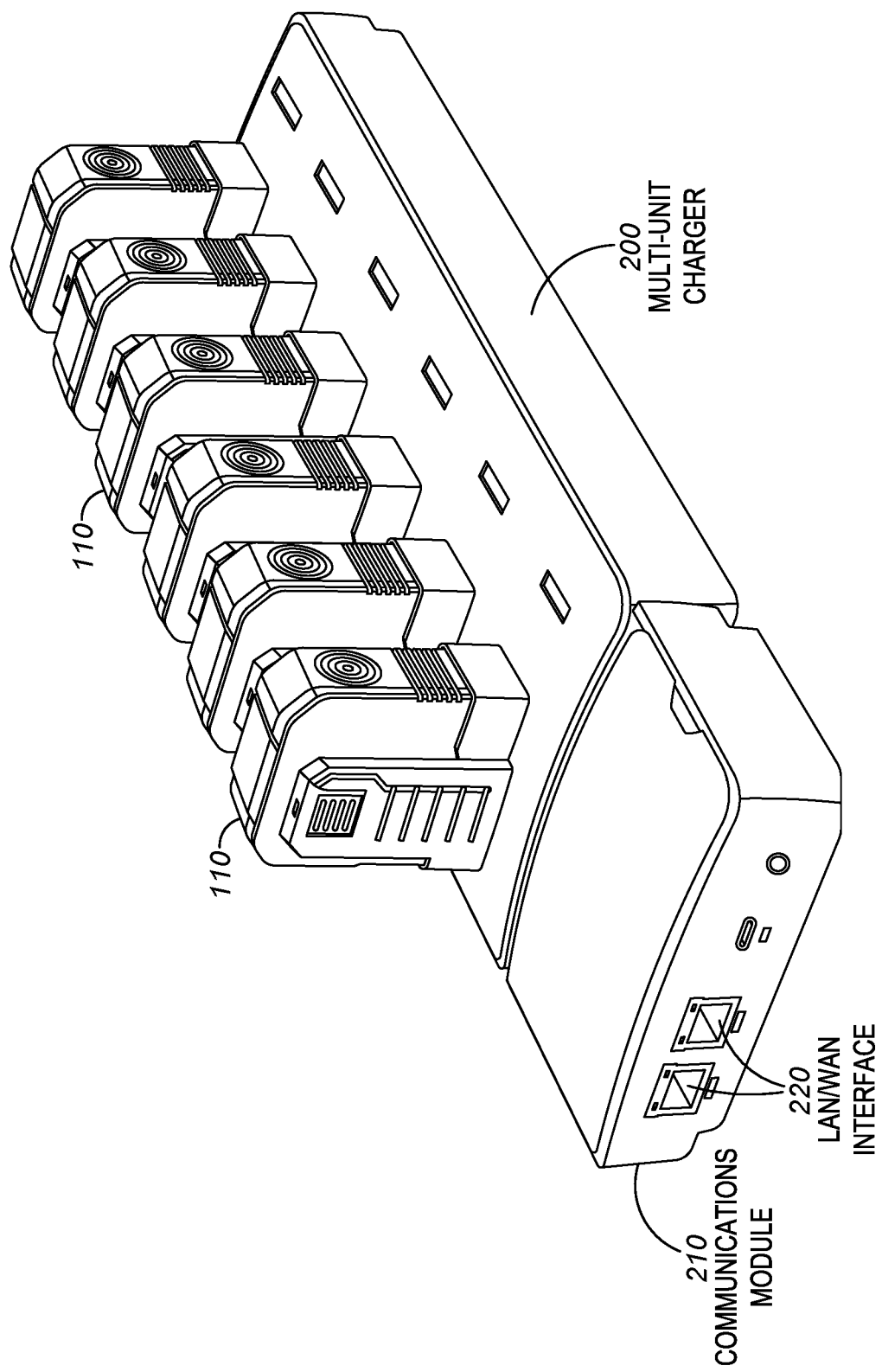
FIG. 2 is an example of a multi-unit charger that is employed as an intermediary storage device in accordance with some embodiments.

Briefly referring to FIG. 2, a multi-unit charger 200 employed as an intermediary storage device 120 for transferring the digital evidence 140 to the cloud server 130 is shown. The multi-unit charger 200 is capable of charging multiple portable devices 110 simultaneously when the portable devices 110 (e.g., cameras) are coupled to the charger 200. In addition to the charging function, the multi-unit charger shown in FIG. 2 also includes a communications module 210 that includes necessary hardware and firmware components for enabling the multi-unit charger 200 to communicate with remote devices such as the cloud server 130 for transferring the digital evidence 140 from the portable device 110 to the cloud server 130, via the second communication link 160. For example, as shown in FIG. 2, the communications module 210 includes a local area network (LAN) interface and/or a wide area network (WAN) interface 220, that can be used to establish the second communication link 160 to transfer digital evidence 140 such as video that requires high bandwidth connection for data transfer. In other embodiments, the second communication link 160 is established using one or more wireless air-interface standards (e.g., long term evolution (LTE) standard) that support transfer of high bandwidth data such as video. The multi-unit charger 200 can be employed for use in public safety agencies such as police departments, where there is often a need, between the work shifts, to simultaneously charge the portable device 110 as well as offload the data (such as digital evidence 140 recorded during the shift) to a storage server (e.g., cloud server 130) to enable the portable device 110 to be available for reassignment before the next shift.

Returning to FIG. 1, the cloud server 130 includes one or more of physical or logical servers that are hosted through a cloud computing platform via a network, and are further capable of providing application services including storing and preserving chain of custody for digital evidence 140 transferred from the portable device 110 via the intermediary storage device 120. The cloud server 130 includes or is connected to one or more cloud storage devices/components at which the digital evidence 140 transferred from the portable device 110 is stored. The network may be a local area network, metropolitan area network, a wide area network, such as the internet or intranet, or a combination thereof. In accordance with some embodiments, the cloud server 130 verifies the authenticity of the portable device 110 (for example, via an authentication server associated with the cloud server 130) and intermediary storage device 120 before the digital evidence 140 can be transferred from the portable device 110 to the cloud server 130 via the intermediary storage device 120.

Figure 3:
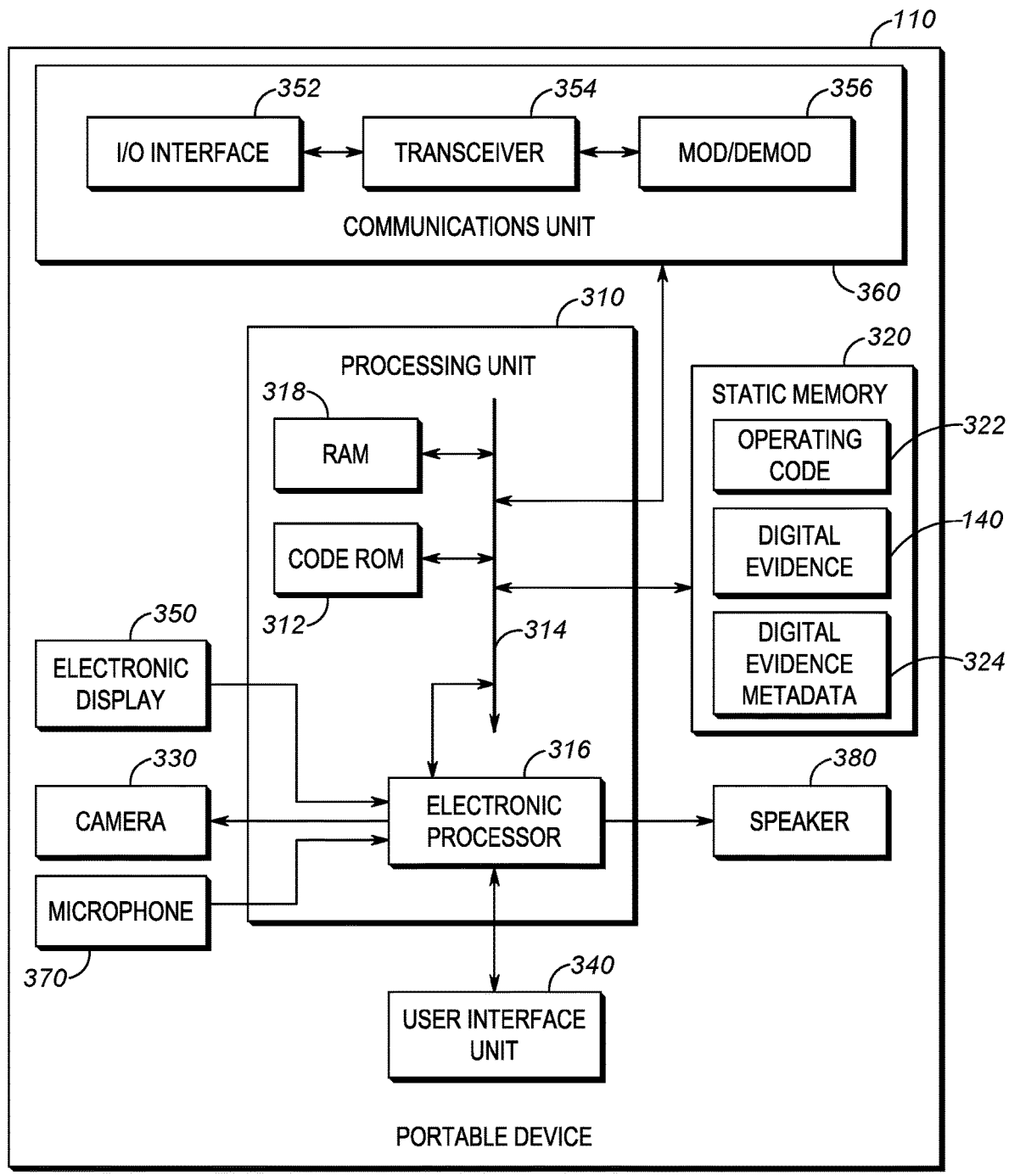
FIG. 3 is a device diagram showing a device structure of a portable device of the system of FIG. 1 in accordance with some embodiments.

FIG. 3 is a block diagram of an example portable device 110. The portable device 110 is an electronic device including a processing unit 310, a static memory 320, a camera 330, a user interface unit 340, an electronic display 350, a communications unit 360, a microphone 370, and a speaker 380. The portable device 110 is presented as an example device that may be programmed and configured to carry out the functions described herein, for example, for preserving the chain of custody for digital evidence 140 captured at the portable device 110. In some embodiments, depending on the type of the portable device 110, the portable device 110 may include fewer or additional components in configurations different from that illustrated in FIG. 3. For example, when the portable device 110 is implemented as a standalone camera, the portable device 110 may include limited or no network capability, and therefore one or more components associated with the communications unit 360 are not implemented at the portable device 110. In other embodiments, the components associated with the portable device 110 are implemented in a distributed manner in multiple electronic devices that interface and/or communicate with each other to perform the functions described herein. Other combinations are possible as well.

The processing unit 310 includes a code Read Only Memory (ROM) 312 coupled to a common data and address bus 314 for storing data for initializing system components. The use of control and data buses 314 for the interconnection between and exchange of information among the various modules and components would be apparent to a person skilled in the art in view of the description provided herein. The processing unit 310 further includes an electronic processor 316 coupled by the common data and address bus 314, to a Random Access Memory (RAM) 318 and the static memory 320. The electronic processor 316 may include hardware ports for coupling to different components of the portable device 110. The electronic processor 316 includes one or more logic circuits, one or more processors, one or more microprocessors, one or more ASIC (application-specific integrated circuits) and one or more FPGA (field-programmable gate arrays), and/or another electronic device. In some embodiments, the electronic processor 316 is not a generic controller and/or a generic device, but a device specifically configured to implement a functionality for transferring digital evidence 140 (stored in static memory 320) to the cloud server 130 via the intermediary storage device 120 while preserving the chain of custody for the digital evidence 140. In some embodiments, the electronic processor 316 specifically comprises a computer executable engine configured to implement specific functionality for transferring the digital evidence 140 to the cloud server 130 via the intermediary storage device 120.

The static memory 320 may store operating code 322 for the electronic processor 316 that, when executed, performs one or more of the operations set forth in the accompanying figures and text. The static memory 320 may comprise non-transitory computer-readable media components, for example hard-disk drive (HDD), an optical disk drive such as a compact disk (CD) drive or digital versatile disk (DVD) drive, a solid state drive (SSD), a tape drive, a flash memory drive, or a tape drive, and the like.

The static memory 320 further stores digital evidence 140 that corresponds to one or more of: a video or image data captured via the camera 330, an audio data captured via the microphone 370, or text data entered by user via the user interface unit 340. In other embodiments, the digital evidence 140 additionally includes sensor data captured by one or more sensors (not shown) (e.g., biometric sensor, motion sensor, sonar sensor, etc.) associated with the portable device 110. In addition to storing the digital evidence 140, the static memory 320 is further configured to store digital evidence metadata 324 associated with the digital evidence 140. The digital evidence metadata 324 includes information corresponding to one or more of: an identifier (e.g., name of a video file corresponding to the digital evidence 140) uniquely identifying the digital evidence 140; a user profile or identifier of the owner of the portable device 110 or of the user operating the portable device 110 at the time the digital evidence 140 was captured/stored; a data type/format (e.g., video, audio, text etc.) of digital evidence 140; a time stamp of capturing/storing the digital evidence 140; a data size of the digital evidence 140; location data identifying locations at which the digital evidence 140 was captured; an incident identifier (e.g., computer aided dispatch (CAD) identifier associated with the burglary incident) corresponding to an incident assigned to the user of the portable device 110; one or more data tags, for example, identifying person, object, or entity of interest associated with the digital evidence 140; and one or more environmental data (e.g., sensor data such as temperature, ambient noise etc.) corresponding to a location at which the digital evidence 140 was captured.

In accordance with the embodiments, the digital evidence metadata 324 further includes a data integrity code that is generated as a function of the digital evidence 140. The data integrity code allows a receiver (e.g., intermediary storage device 120 or cloud server 130) of the digital evidence 140 to validate the data integrity of the digital evidence 140. The data integrity code is generated and the corresponding data integrity validation process is implemented using error detection algorithms, including, but not limited to, checksums, hash functions, cyclic redundancy checks, and message authentication codes (MACs).

The camera 330 includes imaging components such as image sensors and optical components (e.g., lenses) that are controlled by the electronic processor 316 to capture images by sensing light in at least the visible spectrum. The images refer to one or more digital images or sequence of images such as a video of a target object captured by the camera 330. In accordance with some embodiments, the images captured by the camera 330 are stored and marked as digital evidence 140.

The user interface unit 340 operates to receive input from, for example, a user of the portable device 110, to provide system output, or a combination of both. The user interface unit 340 obtains information and signals from, and provides information and signals to, devices both internal and external to the portable device 110 (for example, over one or more wired and/or wireless connections). Input may be provided via different hardware and software elements, for example, a keypad, mouse, microphone, soft keys, icons, or soft buttons on the electronic display 350, a scroll ball, physical buttons, control knobs and the like. In accordance with some embodiments, the user of the portable device 110 may manually input data (e.g., notes from interviewing the witnesses) associated with the digital evidence 140 via the user interface unit 340. The user interface unit 340 also allows the user of the portable device 110 to mark particular stored data, for example, of an image, or a video, or text, as digital evidence 140. In other embodiments, the electronic processor 316 of the portable device 110 marks all data captured at the portable device, by default, as digital evidence 140. The portable device 110 may automatically or based on input received from the user via the user interface unit 340, links the captured evidence to a particular incident (e.g., burglary incident) assigned to the user for investigation. In these embodiments, the user of the portable device 110 may not be authorized to erase any data captured and stored at the memory 320 unless a permission is received from the cloud server 130 after the digital evidence 140 is successfully transferred and validated for data integrity at the cloud server 130.

The electronic display 350 may be provided for displaying digital evidence 140 including images, video, and/or text to the user of the portable device 110. The electronic display 350 may be, for example, a liquid crystal display (LCD) screen or an organic light emitting display (OLED) display screen. In some embodiments, a touch sensitive input interface may be incorporated into the electronic display 350 as well, allowing the user of the portable device 110 to interact with content provided on the electronic display 350.

The communications unit 360 may include one or more wired and/or wireless input/output (I/O) interfaces 352 that are configurable to enable the portable device 110 to communicate with other devices, such as the intermediary storage device 120 and the cloud server 130. In one embodiment, the portable device 110 may obtain the digital evidence 140 and/or digital evidence metadata 324 from other devices or systems via the communications unit 360. The communications unit 360 may include a short-range transmitter such as a Bluetooth™, Zigbee™, or NFC (near field communication) transmitter) with other communication devices and/or an infrastructure RAN (e.g. a wireless communications tower, a cellphone tower, and the like). One or more wireless transceivers 354 may include a long-range transmitter which may implement a direct-mode, conventional, or trunked land mobile radio (LMR) standard, Terrestrial Trunked Radio (TETRA), or other radio protocols or standards (e.g., LTE standard). The communications unit 360 may additionally or alternatively include one or more wireline transceivers 354, such as an Ethernet transceiver, a universal serial bus (USB) transceiver, or similar transceiver configurable to communicate via a twisted pair wire, a coaxial cable, a fiber-optic link, or a similar physical connection to a wireline network. The transceiver 354 is also coupled to a combined modulator/demodulator 356. In some embodiments, the network capability of the portable device 110 may be limited in terms of bandwidth, transmission data rate, or transmission range, and therefore the intermediary storage device 120 with better network capability may be employed by the portable device 110 for transferring the digital evidence 140 to the cloud server 130.

The microphone 370 may be present for capturing audio from a user and/or other environmental or background audio that is further processed by the processing unit 310 and/or is stored/transmitted as digital evidence 140.

The portable device 110 may further include a speaker 380 for reproducing audio from voice data during playback of the digital evidence 140, or may playback alert tones or other types of pre-recorded audio, for example, to indicate that the device 110 is available for reassignment.

In accordance with embodiments, the cloud server 130 includes one or more similar components as illustrated in FIG. 3. In one embodiment, the cloud server 130 similarly includes a processing unit, a communications unit, and a memory to perform the functions described herein. In some embodiments, the components associated with the cloud server 130 are implemented in a distributed manner in multiple electronic devices that interface and/or communicate with each other to perform the functions described herein. Other combinations are possible as well.

Figure 4:
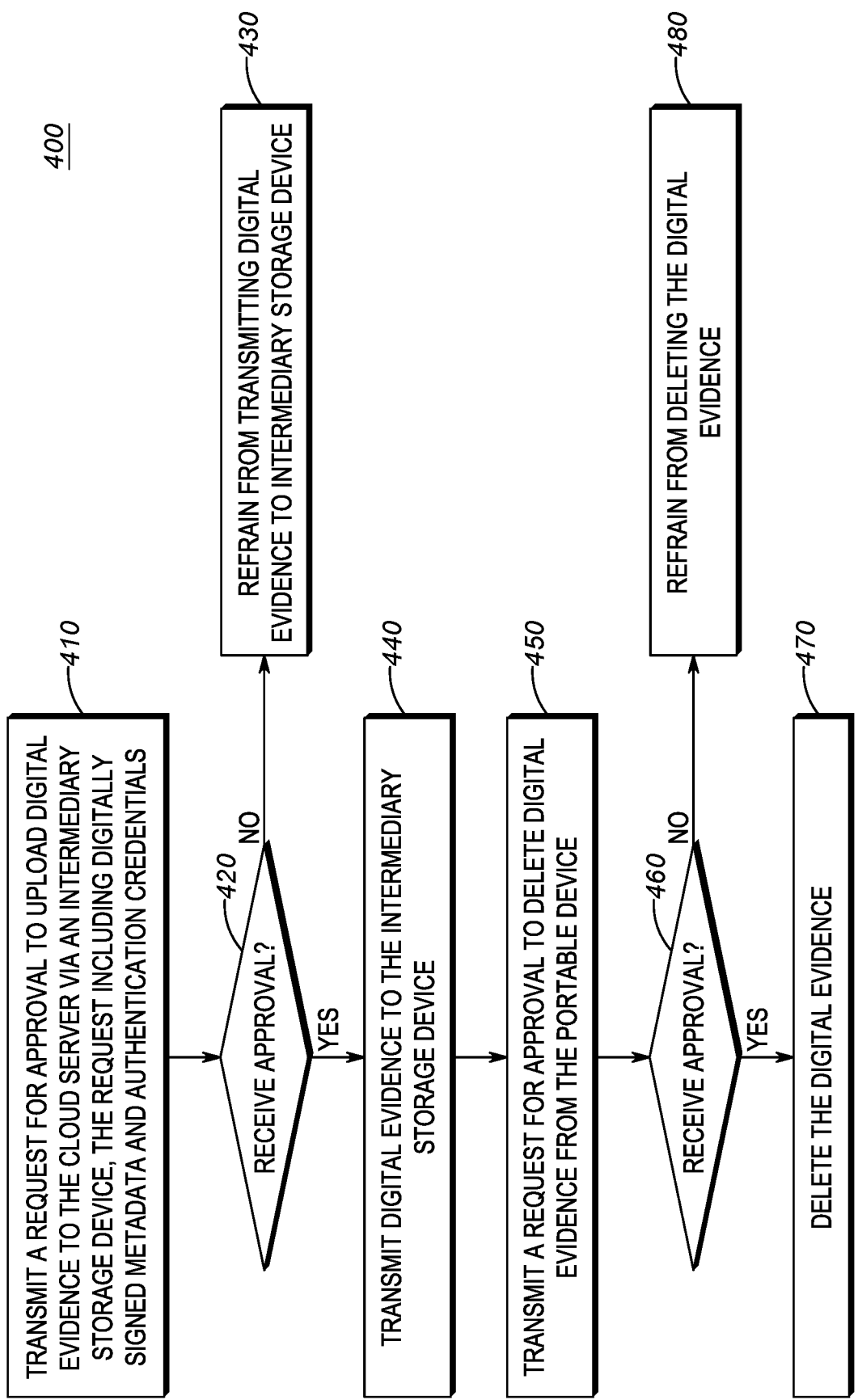
FIG. 4 illustrates a flowchart of a method of operating a portable device to preserve chain of custody for digital evidence captured at the portable device in accordance with some embodiments.

FIG. 4 illustrates a flow chart diagram of a method 400 of operating a portable device 110 to preserve chain of custody for digital evidence 140 captured at the portable device 110 in accordance with some embodiments. While a particular order of processing steps is indicated in FIG. 4 as an example, timing and ordering of such steps may vary where appropriate without negating the purpose and advantages of the examples set forth in detail throughout the remainder of this disclosure. As an example, the method 400 is performed by the electronic processor 316 of the portable device 110. Other embodiments of the method 400 may be performed on multiple processors within the same device or on multiple devices.

At block 410, the portable device 110 initiates a process of transferring the digital evidence 140 captured at the portable device 110 by transmitting a request for approval to the cloud server 130 to upload digital evidence 140 to the cloud server 130 via an intermediary storage device 120.

In accordance with some embodiments, the portable device 110 initiates the process of transferring the digital evidence 140 automatically in response to one or more triggering events. For example, as shown in FIG. 2, the triggering event may be caused when the portable device 110 is placed in a multi-unit charger 200, for instance, for charging the portable device 110 at the end of a work shift of the user associated with the portable device 110. As another example, the triggering event may be caused when the portable device 110 receives an input from a user (e.g., user of the portable device 110) or another device (e.g., from CAD console). The input may be a request to re-assign the portable device 110 from the currently assigned user to another user, or alternatively a request to transfer one or more selected digital evidences 140 stored at the portable device 110 to the cloud server 130. As a further example, the triggering event may correspond to a repeated event that is triggered periodically (e.g., every 8 hours or every day of the week at 6.00 PM). Other variations of triggering events are possible as well.

The request for approval, as transmitted at block 410, includes digitally signed metadata 324 and also a first authentication credential associated with the intermediary storage device 120 and a second authentication credential associated with the portable device 110. The digital evidence 140 may correspond to one or more of: video data, audio data, text data, or combination thereof, that are captured at the portable device 110. The first and second authentication credentials include one or more of a device/user identifier, username-password, digital certificate, encrypted key, biometric key, and the like. The digitally signed metadata 324 includes a data integrity code that is generated as a function of the digital evidence 140 to be uploaded, and further optionally includes information related to one or more of: identifier (e.g., name of a video file corresponding to the digital evidence 140) uniquely identifying the digital evidence 140; a user profile or identifier of the owner of the portable device 110 or of the user operating the portable device 110 at the time the digital evidence 140 was captured/stored; the evidence a data type/format (e.g., video, audio, text etc.) of digital evidence 140; a time stamp of capturing/storing the digital evidence 140; a data size of the digital evidence 140; location data identifying locations at which the digital evidence 140 was captured; an incident identifier (e.g., computer aided dispatch (CAD) identifier) corresponding to an incident assigned to the user of the portable device 110; one or more data tags, for example, identifying person, object, or entity of interest associated with the digital evidence 140; and one or more environmental data (e.g., sensor data such as temperature, ambient noise etc.) corresponding to a location at which the digital evidence 140 was captured.

The digital evidence metadata 324 including the data integrity code is digitally signed using a digital signature that may be created, for example, by encrypting a hash value of the digital evidence metadata 324 to be transmitted using a private key of the portable device 110. The receiver, for example, the cloud server 130 can verify the sender (i.e., identity of the portable device 110) of the digital evidence metadata 324 by comparing a hash value of the received digital evidence metadata 324 with the hash value decoded using the sender's public key. The cloud server 130 can verify that the sender is the portable device 110 when the two hash values match. While the above example is provided as an example to illustrate how the digital evidence metadata 324 is digitally signed for verifying the sender, variations of the above example and/or other types of digital signature algorithms can also be used to digitally sign the digital evidence metadata 324.

In accordance with some embodiments, the portable device 110 establishes a secure communication channel to directly communicate (i.e., by bypassing the intermediary storage server) with the cloud server 130 to transmit the request for approval to upload the digital evidence 140. For example, the portable device 110 may have network capability (e.g., with a narrowband/broadband connection) to support transmission of data (such as digital evidence metadata 324) with limited data size (e.g., in the order of kilobytes to few megabytes). In this example, the portable device 110 may bypass intermediary storage device 120 to transmit the request for approval to the cloud server 130, but may require intermediary storage device 120 that has better network capability (e.g., with a broadband connection) to route the digital evidence 140 for uploading to the cloud server 130. In other embodiments, the request for approval may be routed to the cloud server 130 via the intermediary storage device 120 or via another device in the system 100.

In some embodiments, prior to transmitting the request for approval to upload the digital evidence 140, the portable device 110 verifies the authenticity of the intermediary storage device 120. In these embodiments, the portable device 110, after identifying and/or coupling to the intermediary storage device 120 to be used for uploading the digital evidence 140, transmits an authentication challenge to the intermediary storage device 120 via the first communication link 150. In response, the portable device 110 receives an authentication challenge response including the first authentication credential from the intermediary storage device 120 via the first communication link 150. The portable device 110 then forwards the authentication challenge request and response to the cloud server 130, which may act as an authentication server or as a proxy for authentication server to authenticate the intermediary storage device 120 using the first authentication credential associated with the intermediary storage device 120. The portable device 110 verifies that the intermediary storage device 120 is a trusted device and then performs the function recited at block 410 when it receives a response from the cloud server 130 indicating that the intermediary storage device is a trusted device based on the authentication challenge response received from the intermediary storage device 120. On the other hand, when the portable device 110 receives a response from the cloud server 130 indicating that the intermediary storage device 120 is not a trusted device based on the authentication challenge response received from the intermediary storage device 120, the portable device 110 does not perform the function recited at block and may alternatively identify and/or couple to a different intermediary storage device 120 for uploading the digital evidence to the cloud server 130.

At block 420, the portable device 110, after transmitting the request for approval to the cloud server 130, checks if an approval from the cloud server 130 has been received. If no response to the request has been received from the cloud server 130 or if a response received from the cloud server 130 indicates that the request is rejected, the portable device 110, as shown in block 430, refrains from transmitting the digital evidence 140 to the intermediary storage device 120 for uploading to the cloud server 130. In one embodiment, the received response may provide additional information identifying the reason for rejecting the request to upload the digital evidence 140. For example, the response may indicate that the request is not valid because the portable device 110 and/or the intermediary storage device 120 are not identified as trusted devices by the cloud server 130 based on the received authentication credentials. As another example, the response may indicate that the intermediary storage device 120 is not capable of or available for supporting the transfer of the digital evidence 140 to the cloud server 130. The intermediary storage device 120 may be determined to be not capable of supporting the transfer of the digital evidence when the data size of the digital evidence 140 is larger than available storage size of the intermediary storage device 120 or when the intermediary storage device 120 has limited network capability to support the transfer of the digital evidence 140. In such cases, the portable device 110 refrains from transmitting the digital evidence 140 to the intermediary storage device 120 and may further take one or more additional actions such as: deactivating a data connection established with the intermediary storage device 120; providing an alert to the user (e.g., via the electronic display 350) that the intermediary storage device 120 is not capable of or not available for uploading the digital evidence 140 to the cloud server 130; identifying another intermediary storage device 120, for example, by presenting, via the electronic display 350, an identifier and/or a location of another multi-unit charger 200 that may be used for uploading the digital evidence 140.

On the other hand, when a response indicating approval to upload the digital evidence 140 via the intermediary storage device 120 is received from the cloud server 130, the portable device 110, at block 440, transmits the digital evidence 140 to the intermediary storage device 120 via the first communication link 150. In one embodiment, the response indicating the approval as received from the cloud server 130 further identifies a resource identifier (e.g., a network address or a uniform resource locator (URL) link) corresponding to a cloud storage component associated with the cloud server 130 at which the digital evidence 140 is to be uploaded. In this embodiment, the portable device 110 transmits the resource identifier along with the digital evidence to the intermediary storage device 120 to enable the intermediary storage device 120 to upload the digital evidence 140 to the cloud storage component as identified by the resource identifier.

In one embodiment, the portable device 110 further transmits digital evidence metadata 324 including data integrity code to the intermediary storage device 120 to enable the intermediary storage device 120 to validate the data integrity of the digital evidence prior to uploading the digital evidence 140 to the cloud storage component of the cloud server 130. The digital evidence 140 may be transmitted to the intermediary storage device 120 in real-time, for example, as a video stream. The intermediary storage device 120, may in turn, uploads the digital evidence 140 to the cloud server 130, either in real time or after receiving the entire stream from the portable device 110.

Next, at block 450, the portable device 110 transmits a request for approval to delete the digital evidence 140 stored at the memory 320 of the portable device 110. In accordance with some embodiments, the portable device 110 is not enabled to delete the digital evidence 140 stored at the memory 320 of the portable device 110 unless an approval is received from the cloud server 130 which authorizes or causes the removal of the digital evidence 140 from the memory 320 of the portable device 110. This approval is provided by the cloud server 130 only after the digital evidence 140 as identified by the digital evidence metadata 324 is validated for data integrity and successfully stored at the cloud storage component of the cloud server 130. This process of removing the digital evidence after receiving an explicit approval from the cloud server 130 ensures that the chain of custody of digital evidence 140 is not violated. In addition, this process ensures that the digital evidence captured at the portable device 110 is always linked to the correct user (i.e., user of the portable device 110 at the time of capturing the digital evidence) since, otherwise it is possible that the portable device 110 is re-assigned to another user while the digital evidence captured by the previous user is still stored in the memory 320. In accordance with some embodiments, the portable device 110 is re-assigned to another user only after removing the digital evidence 140 from the memory 320 in accordance with the approval received from the cloud server 130.

The request for approval transmitted at block 450 may include information included in the digitally signed metadata 324, for example, identifier of the digital evidence 140, to enable the cloud server 130 to identify the digital evidence 140 and further check whether the digital evidence 140 is validated for data integrity and uploaded to the cloud storage component of the cloud server 130. In one embodiment, the portable device 110 may receive an acknowledgment from the cloud server 130 indicating that the digital evidence 140 is uploaded to the cloud server 130 when the digital evidence 140 received from the intermediary storage device 120 is validated for data integrity and stored at the cloud storage component of the cloud server 130.

Next, at block 460, the portable device 110 checks whether it has received an approval from the cloud server 130 to delete the digital evidence 140 stored at the memory 320 of the portable device 110. When the portable device 110 receives the approval from the cloud server 130, the portable device 110 deletes the digital evidence 140 from the static memory 320 of the portable device 110 as shown in block 470. The portable device 110 may present, via the electronic display 350, a notification to the user of the portable device 110 indicating that the digital evidence 140 is deleted from the portable device 110. In one embodiment, after deleting the digital evidence 140, the portable device 110 may also present, via the electronic display 350, a notification indicating that the portable device 110 is available for reassignment when it is determined that the portable device 110 has been returned by the user (e.g., placed on the multi-unit charger 200 at the end of work-shift) for reassignment.

Alternatively, when no approval is received, for example, before expiry of a set timer, or when a response received from the cloud server 130 indicates that the request for approval to delete the digital evidence 140 is rejected, the portable device 110, at block 480, refrains from deleting the digital evidence 140 from the memory 320 of the portable device 110. In this case, the response indicating the rejection may further include information identifying a reason for rejecting the request to delete the digital evidence 140. The cloud server 130 may reject the approval to delete the digital evidence 140 for reasons such as the digital evidence 140 as not being completely received from the intermediary storage device 120, or the digital evidence 140 as not being completely uploaded to the cloud storage component, or the data integrity of the digital evidence 140 as not being valid.

The portable device 110 may repeat the same process as described in the method 400 for all digital evidences stored at the portable device 110. In accordance with some embodiments, the portable device 110 presents, via the electronic display 350, an indication that the device is available for re-assignment only when all digital evidences 140 stored at the memory 320 is successfully transferred to the cloud server 130.

Figure 5:
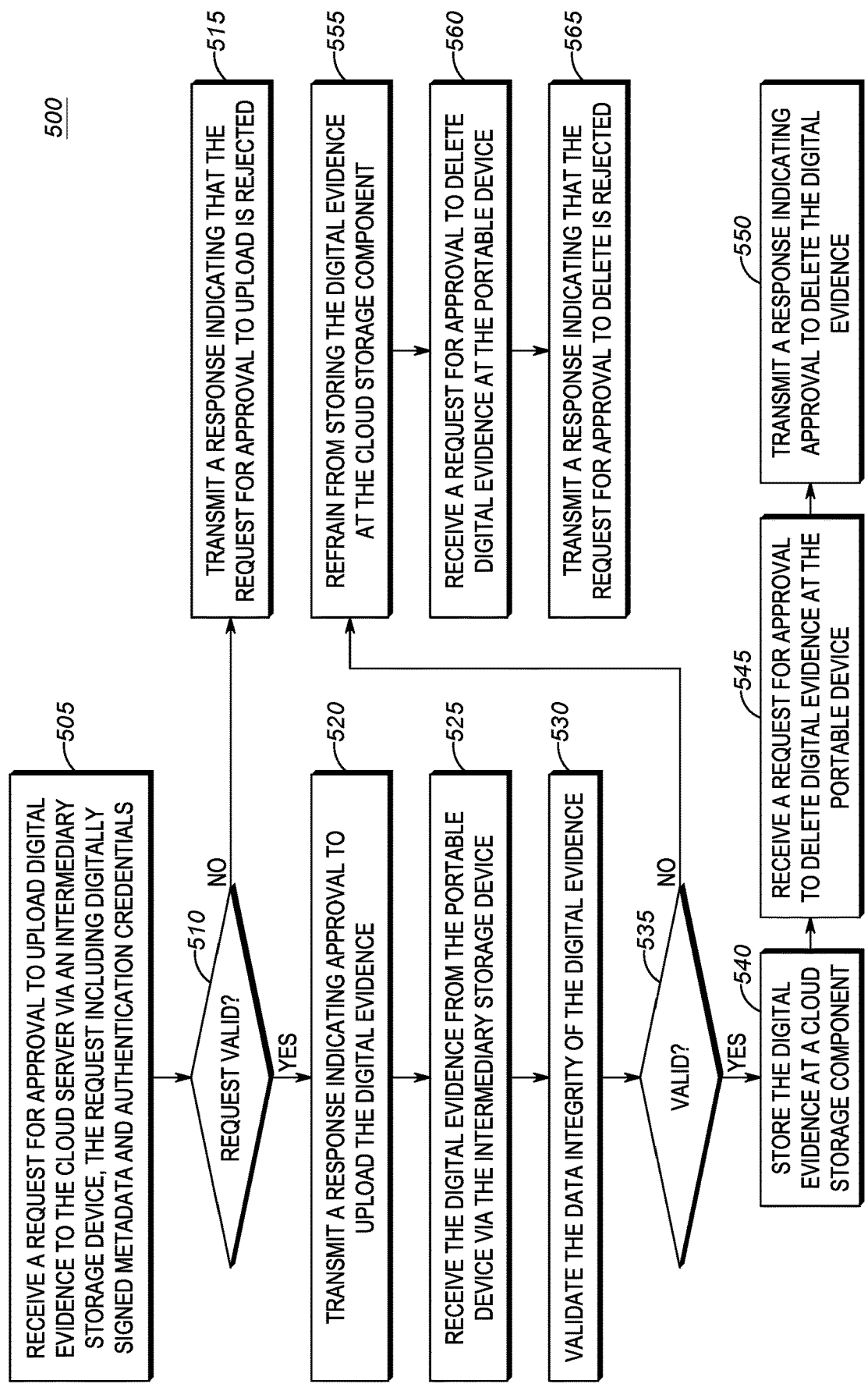
FIG. 5 illustrates a flowchart of a method of operating a cloud server to preserve chain of custody for digital evidence captured at the portable device in accordance with some embodiments Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

FIG. 5 illustrates a flow chart diagram of a method 500 of operating a cloud server 130 to preserve the chain of custody for digital evidence 140 captured at the portable device 110 in accordance with some embodiments. While a particular order of processing steps is indicated in FIG. 5 as an example, timing and ordering of such steps may vary where appropriate without negating the purpose and advantages of the examples set forth in detail throughout the remainder of this disclosure. As an example, the method 500 is performed by the electronic processor (not shown) of the cloud server 130. Other embodiments of the method 500 may be performed on multiple processors within the same device or on multiple devices.

At block 505, the cloud server 130 receives a request for approval from the portable device 110 to upload digital evidence 140 to the cloud server 130 via an intermediary storage device 120. The request for approval includes a digitally signed digital evidence metadata 324 and also a first authentication credential associated with the intermediary storage device 120 and a second authentication credential associated with the portable device 110. The digital evidence 140 may correspond to one or more of: video data, audio data, text data, or combination thereof, that are captured at the portable device 110. The first and second authentication credentials include one or more of a device/user identifier, username-password, digital certificate, encrypted key, biometric key, and the like. The digital evidence metadata 324 includes a data integrity code that is generated as a function of the digital evidence 140 to be uploaded, and further optionally includes information related to one or more of: identifier (e.g., name of a video file corresponding to the digital evidence 140) uniquely identifying the digital evidence 140; a user profile or identifier of the owner of the portable device 110 or of the user operating the portable device 110 at the time the digital evidence 140 was captured/stored; the evidence a data type/format (e.g., video, audio, text etc.) of digital evidence 140; a time stamp of capturing/storing the digital evidence 140; a data size of the digital evidence 140; location data identifying locations at which the digital evidence 140 was captured; an incident identifier (e.g., computer aided dispatch (CAD) identifier) corresponding to an incident assigned to the user of the portable device 110; one or more data tags, for example, identifying person, object, or entity of interest associated with the digital evidence 140; and one or more environmental data (e.g., sensor data such as temperature, ambient noise etc.) corresponding to a location at which the digital evidence 140 was captured.

In one embodiment, the cloud server 130 receives the request for approval via a secure communication channel, for example, a narrowband communication channel, that is directly established (i.e., by bypassing the intermediary storage device 120) between the cloud server 130 and the portable device 110. In another embodiment, the cloud server 130 may receive the request for approval through the intermediary storage device 120, via the second communication link 160.

In accordance with some embodiments, the cloud server 130 may authenticate the use of intermediary storage device 120 for transferring the digital evidence 140 to the cloud server 130 prior to receiving this request for approval from the portable device 110. In these embodiments, the cloud server 130 receives, from the portable device 110, an authentication challenge response including the first authentication credential associated with the intermediary storage device 120. The cloud server 130 then transmits a response indicating whether the intermediary storage device 120 is a trusted device or not.

Next, at block 510, the cloud server 130 verifies whether the received request for approval is valid based on the information included in the digitally signed metadata 324, first authentication credential associated with the intermediary storage device 120, and second authentication credential associated with the portable device 110. In one embodiment, the cloud server 130 verifies that the received request for approval is valid when one or more of the following conditions are satisfied: a) the intermediary storage device 120 and portable device 110 are respectively determined as trusted devices based on the first and second authentication credentials received from the portable device 110; and b) the intermediary storage device 120 is capable of supporting (e.g., in terms of storage capacity, network capability, or availability) the transfer of the digital evidence 140 to the cloud server 130. For example, the cloud server 130 determines that the intermediary storage device 120 is capable of supporting the transfer of the digital evidence 140 when the intermediary storage device 120 has storage capacity for storing an amount of data corresponding to the data size of the digital evidence 140 as identified in the received digitally signed evidence metadata 324. On the other hand, when the portable device 110 or intermediary storage device 120 is determined to be not a trusted device or when the intermediary storage device 120 is determined to be not capable of supporting the transfer of digital evidence 140 to the cloud server 130, the cloud server 130 verifies that the received request for approval is not valid.

Accordingly, when the cloud server 130 determines that the received request is not valid, the cloud server 130, at block 515, transmits a response, via the secure communication channel, indicating that the request for approval to upload the digital evidence 140 is rejected. In one embodiment, the response also includes additional information identifying the reason (e.g., intermediary storage device 120 does not have sufficient storage) for rejecting the request. Alternatively, when the cloud server 130 determines that the received request is valid, the cloud server 130, at block 520, transmits a response indicating approval to upload the digital evidence 140 via the intermediary storage device 120. In one embodiment, the cloud server 130 includes in the response, a resource identifier (e.g., a network address or a URL link) corresponding to a cloud storage component of the cloud server 130 at which the digital evidence 140 is to be uploaded.

Next, at block 525, the cloud server 130 receives the digital evidence 140 from the intermediary storage device 120, via the second communication link 160 (for example, via a broadband communication channel). In one embodiment, the intermediary storage device 120 receives the digital evidence 140 and forwards the digital evidence 140 to a cloud storage component of the cloud server 130 as identified by the resource identifier.

Next, at block 530, the cloud server 130 validates the data integrity of the received digital evidence 140 using the data integrity code included in the digitally signed evidence metadata 324. For example, when the data integrity code includes a checksum value corresponding to the digital evidence 140, the cloud server 130 calculates checksum value on the received digital evidence 140 and further compares the calculated checksum value with the received checksum value. If the two checksum values match, the data integrity of the received digital evidence 140 is ensured and the cloud server 130 marks the validity of the data integrity to be valid. Otherwise, if the two checksum values do not match, the cloud server 130 marks the data integrity of the digital evidence 140 to be invalid. While checksum values are used herein to describe the data integrity validation process, other types of functions, such as hash values can be used to validate the data integrity as well.

At block 535, the cloud server 130 determines whether the data integrity of the received digital evidence 140 is marked as valid. When the data integrity of the digital evidence 140 is marked as valid, the cloud server 130, at block 540, stores the digital evidence 140 at a cloud storage component associated with the cloud server 130. The cloud server 130 may also send an acknowledgment indicating that the digital evidence 140 is (i.e., after successfully validating the data integrity) uploaded to the cloud server 130. In one embodiment, after validating the data integrity, the cloud server 130 may further provide permission to the portable device 110 to delete the digital evidence 140, prior to receiving a request for approval to delete the digital evidence 140 from the portable device 110. In accordance with some embodiments, the cloud server 130 associates the digital evidence 140 stored at the cloud storage component to various devices (and corresponding users) including a source device (e.g., portable device 110) and intermediate devices (intermediary storage device 120) at which the digital evidence 140 was captured/stored prior to uploading the digital evidence 140 to the cloud server 130. This association or linking of the digital evidence 140 to the devices/users allows for tracing the chain of custody for digital evidence 140 uploaded to the cloud server 130. In accordance with some embodiments, the entire digital evidence 140 along with the above association information is encrypted prior to being stored at the cloud storage component of the cloud server 130.

At block 545, the cloud server 130 receives a request for approval, for example, via the secure communication channel, to delete the digital evidence 140 stored at the memory 320 of the portable device 110. This approval is provided by the cloud server 130 only after the digital evidence 140 as identified by the digital evidence metadata 324 is validated for data integrity and successfully stored at the cloud storage component of the cloud server 130. The request for approval transmitted at block 450 may include information included in the digitally signed evidence metadata 324, for example, identifier of the digital evidence 140, to enable the cloud server 130 to identify the digital evidence 140 and further check whether the digital evidence 140 is validated for data integrity and uploaded to the cloud storage component of the cloud server 130. In accordance with some embodiments, the portable device 110 is not enabled to delete the digital evidence 140 stored at the memory 320 of the portable device 110 unless an approval is received from the cloud server 130 which authorizes or causes the removal of the digital evidence 140 from the memory 320 of the portable device 110.

At block 550, the cloud server 130 transmits, for example, via the secure communication channel, a response indicating an approval to delete the digital evidence 140 since the cloud server 130, in this case, has already marked the data integrity of the digital evidence 140 to be valid and stored the digital evidence 140 at the cloud storage component as shown in block 540. In accordance with some embodiments, the cloud server 130 receives a confirmation from the portable device 110 indicating that the digital evidence 140 is deleted from the portable device 110. In these embodiments, the cloud server 130, after receiving the confirmation, may transmit an instruction to the portable device to provide an indication that the portable device is available for reassignment when a reassignment request is received from the portable device and/or another user/device in the system 100.

Returning to block 535, when the cloud server 130 determines that the data integrity of the digital evidence 140 is marked as invalid, the cloud server 130, as shown in block 555, refrains from storing the digital evidence 140 at the cloud storage component of the cloud server 130. Alternatively, the cloud server 130 may store the digital evidence 140 at the cloud storage component, but does not link or associate the various devices/users associated with the digital evidence 140 to the stored digital evidence 140.

Next, at block 560, the cloud server 130 receives a request for approval, for example, via the secure communication channel, to delete the digital evidence 140 stored at the memory 320 of the portable device 110. This approval is provided by the cloud server 130 only after the digital evidence 140 as identified by the digital evidence metadata 324 is validated for data integrity and successfully stored at the cloud storage component of the cloud server 130. The request for approval transmitted at block 560 may include information included in the digitally signed evidence metadata 324, for example, identifier of the digital evidence 140, to enable the cloud server to identify the digital evidence 140 and further check whether the digital evidence 140 is validated for data integrity and uploaded to the cloud storage component associated with the cloud server 130.

At block 565, the cloud server 130 transmits, for example, via the secure communication channel, a response indicating that the request for approval to delete digital evidence 140 is rejected since the cloud server 130, in this case, has marked the data integrity of the received digital evidence 140 to be invalid and further refrained from storing the digital evidence 140 at the cloud storage component at block 555. In this case, the response indicating the rejection may further include information identifying a reason (e.g., data integrity is not valid) for rejecting the request to delete the digital evidence 140.

In accordance with some embodiments, the cloud server 130 stores a full audit log of the above described process for traceability of the chain of custody for digital evidence 140. The audit log may include information related to the type of messages transmitted and/or received (e.g., request message received or corresponding response message transmitted to approve the uploading or deletion of the digital evidence 140 or to verify the authenticity of the intermediary storage device) at the cloud server 130, type of actions performed at the cloud server 130 (e.g., providing approval to upload or delete digital evidence 140, verifying data integrity, etc.), identifiers of the devices (e.g., portable device 110 and intermediary storage device 120) from which the messages were transmitted; user identifiers corresponding to the users (e.g., user of the portable device 110) operating the device that captured the digital evidence 140; time stamp associated with such message transmission/reception or such actions; and the like. The audit log allows the cloud server 130 and/or another device to trace the chain of custody for digital evidence 140, for example, to identify a device at which the digital evidence 140 was captured, or identify an intermediary storage device through which the digital evidence 140 was transmitted before being stored at the cloud storage component, or identify a user who was operating the device at the time of capturing the digital evidence 140.

The chain of custody for digital evidence 140 captured at the portable device 110 is thereby preserved using the methods 400, 500 by: a) copying the digital evidence 140 from the portable device 110 to a more stable and redundant cloud storage component; b) ensuring that the intermediary storage device 120 is a trusted device prior to transmitting the digital evidence 140; c) digitally signing the evidence metadata 324 including the data integrity code; d) enabling the cloud server 130 to validate the digital evidence 140 using the data integrity code included in the digitally signed metadata 324; e) associating or linking the uploaded digital evidence 140 to correct identity of the user (e.g., officer) who captured the digital evidence 140 using the portable device 110; and f) deleting the digital evidence 140 from the memory 320 of the portable device 110 only after receiving an approval to delete the digital evidence 140 from the cloud server 130. In accordance with some embodiments, the same process as described with reference to the methods 400, 500 are applied for transferring all digital evidences 140 stored at the portable device 110 to the cloud server 130.

While the above embodiments are directed towards transferring the digital evidence 140 via the intermediary storage device 120, in some embodiments, the portable device 110 is configured to directly transfer the digital evidence 140 to a cloud storage component of the cloud server 130. In these embodiments, the portable device 110 may have sufficient network capability (e.g., with LTE connection) to transfer digital evidence 140 including video data to the cloud server 130. In some of these embodiments, the portable device 110 is configured to transfer digital evidence 140 directly to cloud server 130 based on an instruction received from the cloud server 130. The cloud server 130 may send instruction to portable device 110 to directly transfer the digital evidence 140, for example, when it is determined that the intermediary storage device 120 identified by the portable device 110 is not a trusted device or alternatively not capable of or available to transfer the digital evidence 140.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for preserving chain of custody for digital evidence captured at a portable device, the method comprising:

transmitting, at the portable device, to a cloud server, a request for approval to upload the digital evidence to the cloud server via an intermediary storage device, the request comprising a digitally signed metadata associated with the digital evidence, a first authentication credential associated with the intermediary storage device, and a second authentication credential associated with the portable device, wherein the digitally signed metadata includes a data integrity code that is generated as a function of the digital evidence to be uploaded in response to receiving an approval from the cloud server;

receiving, at the portable device, a first response to the request for approval from the cloud server, the first response indicating approval provided by the cloud server to upload the digital evidence to the cloud server via the intermediary storage device, wherein the approval is provided by the cloud server after verifying that the intermediary storage device is a trusted device and further the intermediary storage device is capable of supporting the transfer of the digital evidence from the portable device to the cloud server;

responsive to receiving the first response, transmitting, at the portable device, the digital evidence to the intermediary storage device for uploading to the cloud server only after checking that the first response indicates an approval from the cloud server to upload the digital evidence via the intermediary storage device;

transmitting, at the portable device, to the cloud server, a request for approval to delete the digital evidence from the portable device;

receiving, at the portable device, a second response from the cloud server, the second response indicating an approval to delete the digital evidence from the portable device and responsive to receiving the second response, deleting, at the portable device, the digital evidence from the portable device.

2. The method of claim 1, further comprising:

responsive to deleting the digital evidence from the portable device, providing, at the portable device, an indication that the portable device is available for reassignment.

3. The method of claim 1, wherein the data integrity code enables the cloud server to validate the data integrity of the digital evidence uploaded to the cloud server using the data integrity code.

4. The method of claim 1, further comprising:

transmitting the data integrity code to the intermediary storage device to enable the intermediary storage device to validate the data integrity of the digital evidence prior to uploading the digital evidence to the cloud server.

5. The method of claim 1, wherein prior to transmitting the request for approval, the method further comprising:

verifying that the intermediary storage device is a trusted device based on the first authentication credential associated with the intermediary storage device.

6. The method of claim 5, wherein verifying that the intermediary storage device is the trusted device comprises:

transmitting, at the portable device, an authentication challenge to the intermediary storage device;

receiving, at the portable device, an authentication challenge response including the first authentication credential from the intermediary storage device;

forwarding, at the portable device, the authentication challenge response to the cloud server for verification at the cloud server; and receiving, at the portable device, a response from the cloud server, the response indicating that the intermediary storage device is a trusted device.

7. The method of claim 1, wherein prior to transmitting a request for approval to delete the digital evidence, the method comprising one of:

receiving, at the portable device, from the cloud server, an acknowledgment indicating that the digital evidence is uploaded to the cloud server.

8. The method of claim 1, wherein the digitally signed metadata further includes information selected from the group consisting of:

a unique identifier assigned to the digital evidence;
a time stamp associated with the digital evidence;
data size of the digital evidence;
a location associated with the digital evidence;
an incident identifier associated with the digital evidence; and
one or more tags associated with the digital evidence.

9. The method of claim 1, wherein the portable device is a body wearable camera.

10. The method of claim 1, wherein the intermediary storage device is a multi-unit charger configured to charge multiple portable devices simultaneously, the method further comprising:

charging a battery at the portable device while the digital evidence is being uploaded to the cloud server via the multi-unit charger.

11. The method of claim 1, wherein the request for approval to upload the digital evidence is transmitted to the cloud server via a narrowband communication channel established between the portable device and the cloud server and further wherein the digital evidence is transmitted to the cloud server via a broadband communication channel established between the intermediary storage device and the cloud server.

12. A method for preserving chain of custody for digital evidence captured at a portable device, the method comprising:

receiving, at a cloud server, from the portable device, a request for approval to upload the digital evidence to the cloud server via an intermediary storage device, the request comprising digitally signed metadata associated with the digital evidence, a first authentication credential associated with the portable device, and a second authentication credential associated with the intermediary storage device, wherein the digitally signed metadata includes a data integrity code that is generated as a function of the digital evidence to be uploaded in response to receiving an approval from the cloud server;

verifying, at the cloud server, whether the request is valid based on the digitally signed metadata, first authentication credential, and second authentication credential;

verifying, at the cloud server, whether the intermediary storage device is a trusted device and whether the intermediary storage device is capable of supporting the transfer of the digital evidence from the portable device to the cloud server;

responsive to verifying that the request is valid and verifying that the intermediary storage device is a trusted device and the intermediary storage device is capable of supporting the transfer of the digital evidence from the portable device to the cloud server, transmitting, at the cloud server, to the portable device, a first response indicating approval to upload the digital evidence to the cloud server via the intermediary storage device;

receiving, at the cloud server, in response to transmitting the first response, the digital evidence from the portable device via the intermediary storage device;

validating, at the cloud server, the data integrity of received digital evidence using the data integrity code;

storing the received digital evidence at a cloud storage component of the cloud server when the data integrity of the received digital evidence is valid;

receiving, at the cloud server, a request for approval to delete the digital evidence from the portable device; and transmitting, at the cloud server, a second response indicating an approval to delete the digital evidence from the portable device.

13. The method of claim 12, further comprising:

receiving, at the cloud server, a confirmation that the digital evidence is deleted from the portable device; and responsive to receiving the confirmation, transmitting an instruction to the portable device to provide an indication that the portable device is available for reassignment.

14. The method of claim 12, wherein prior to transmitting the second response, the method comprising:

determining, at the cloud server, that the data integrity of the received digital evidence is valid.

15. The method of claim 12, wherein the digitally signed metadata further includes information selected from the group consisting of:

a unique identifier assigned to the digital evidence;
a time stamp associated with the digital evidence;
data size of the digital evidence;
a location associated with the digital evidence;
an incident identifier associated with the digital evidence; and
one or more tags associated with the digital evidence.

16. The method of claim 15, wherein verifying that the intermediary storage device is capable of supporting the transfer of the digital evidence from the portable device to the cloud server, comprises at least one of:

verifying that the intermediary storage device is capable of storing an amount of data corresponding to the data size of the digital evidence; or verifying that the intermediary storage device has network capability to transfer the digital evidence from the portable device to the cloud server.

17. The method of claim 12, further comprising:

responsive to verifying that the request is not valid, transmitting, at the cloud server, to the portable device, a third response rejecting the request to upload the digital evidence to the cloud server.

18. The method of claim 12, further comprising:

responsive to determining that the data integrity of the received digital evidence is not successfully validated using the data integrity code, transmitting, at the cloud server, an acknowledgment to the portable device indicating that the digital evidence is not uploaded at the cloud server.

19. The method of claim 12, wherein the portable device is a body wearable camera, and further wherein the intermediary storage device is a multi-unit charger configured to charge multiple portable devices simultaneously.

20. A portable device, comprising:

a memory for storing digital evidence;

a communications unit configured to be coupled with an intermediary storage device for transferring the digital evidence to a cloud server via the intermediary storage device; and an electronic processor communicatively coupled with the memory and communications unit, the electronic processor configured to:

transmit, via the communications unit, to the cloud server, a request for approval to upload the digital evidence to the cloud server via the intermediary storage device, the request comprising a digitally signed metadata associated with the digital evidence, a first authentication credential associated with the intermediary storage device, and a second authentication credential associated with the portable device, wherein the digitally signed metadata includes a data integrity code that is generated as a function of the digital evidence to be uploaded in response to receiving an approval from the cloud server;

receive, via the communications unit, a first response to the request for approval from the cloud server, the first response indicating approval to upload the digital evidence to the cloud server via the intermediary storage device, wherein the approval is provided by the cloud server after verifying that the intermediary storage device is a trusted device and further the intermediary storage device is capable of supporting the transfer of the digital evidence from the portable device to the cloud server;

responsive to receiving the first response, transmit, via the communications unit, the digital evidence to the intermediary storage device for uploading to the cloud server only after checking that the first response indicates an approval from the cloud server to upload the digital evidence via the intermediary storage device;

transmit, via the communications unit, to the cloud server, a request for approval to delete the digital evidence from the memory;

receive, via the communications unit, a second response from the cloud server, the second response indicating an approval to delete the digital evidence from the portable device; and responsive to receiving the second response, delete the digital evidence from the memory.

21. The method of claim 12, further comprising:

storing, at the cloud server, association information associating the digital evidence stored at the cloud storage component to the intermediary storage device through which the digital evidence was uploaded to the cloud server.

* * * * *